United States Patent [19]
Buchele et al.

[11] 3,794,198
[45] Feb. 26, 1974

[54] SAFETY DOOR FOR THE UNLOADING MECHANISM OF SELF-UNLOADING WAGONS

[75] Inventors: Wesley F. Buchele; Leo C. Peters, both of Ames, Iowa

[73] Assignee: Iowa State University Research Foundation, Inc., Ames, Iowa

[22] Filed: June 12, 1972

[21] Appl. No.: 261,930

[52] U.S. Cl.............. 214/519, 214/83.32, 198/213
[51] Int. Cl.............................................. B60p 1/40
[58] Field of Search .. 214/83.32, 83.14, 83.26, 519, 214/522; 198/65, 213; 100/53, 147; 99/337; 222/491, 502, 507; 241/37.5

[56] References Cited
UNITED STATES PATENTS

| | | | |
|---|---|---|---|
| 3,547,292 | 12/1970 | Sammarco | 214/83.32 X |
| 2,487,693 | 11/1949 | Canon | 198/65 |
| 1,667,737 | 5/1928 | Nichols | 198/221 X |

FOREIGN PATENTS OR APPLICATIONS

| | | | |
|---|---|---|---|
| 238,454 | 9/1911 | Germany | 222/413 |
| 445,426 | 6/1927 | Germany | 100/147 |

*Primary Examiner*—Albert J. Makay
*Attorney, Agent, or Firm*—Zarley, McKee & Thomte

[57] ABSTRACT

A safety door for the discharge opening of a self-unloading wagon is disclosed herein. The wagon includes a material receiving box having a first conveyor therein for conveying the material towards one end thereof. A cross conveyor is mounted at the one end of the box for conveying the material outwardly from the box through the lower end of a discharge opening formed in the side of the box. A material beater means is rotatably mounted in the box above the cross conveyor. The safety door extends across the discharge opening to prevent the operator from reaching inwardly through the discharge opening. The safety door is self-closing and is opened by the material being discharged outwardly through the discharge opening.

5 Claims, 3 Drawing Figures

PATENTED FEB 26 1974　　　　　　　　　　　　　　　　3,794,198

SAFETY DOOR FOR THE UNLOADING MECHANISM OF SELF-UNLOADING WAGONS

The unloading mechanism of self-unloading wagons contributes to many farm accidents. Men working around the wagon during unloading operations normally station themselves near the unloading mechanism to observe the flow of material from the wagon. This is particularly true when the wagon is operated at a stationary position such as is the case when feeding silage into a silage blower, a feed bunk or a grinder. While in this position, the operator sometimes attempts to obtain uniform flow to prevent plugging of the grinder or blower and to prevent stoplages in the self-unloading wagon. During such attempts, the operator often inserts his hand through the discharge opening of the wagon box so as to direct the flow of silage into the beaters or the auger of the self-unloading wagon. It is during this time that the operator becomes careless and is frequently caught in the beaters of the self-unloading wagon or the auger of the unloading mechanism or other types of mechanisms in and around the self-unloading wagon.

Therefore, it is a principal object of this invention to provide a safety door means for a self-unloading wagon.

A further object of this invention is to provide a safety door means which covers the discharge opening of a self-unloading wagon.

A further object of this invention is to provide a safety door means for a self-unloading wagon which is normally closed but which is opened by the material being discharged outwardly therethrough.

A further object of this invention is to provide a safety door means for a self-unloading wagon, the door means being constructed of a mesh material to permit the operator to see therethrough.

A further object of this invention is to provide a safety door means for a self-unloading wagon which prevents the operator from reaching into the interior of the wagon through the discharge opening.

A further object of this invention is to provide a safety door means for a self-unloading wagon which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims and illustrated in the accompanying drawings, in which:

Figure 1:
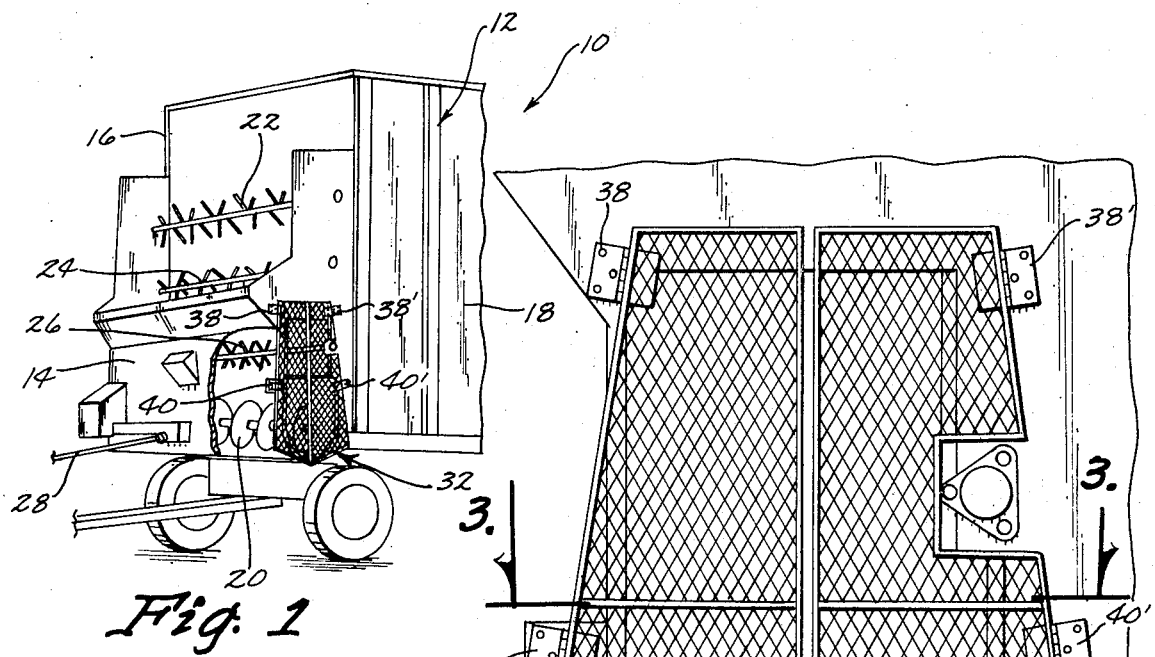
FIG. 1 is a partial front perspective view of a self-unloading wagon having the safety door of this invention mounted thereon.

In FIG. 1, the numeral 10 refers to a conventional self-unloading wagon including a material receiving box 12 having a front end 14 and sides 16 and 18. The box 12 has a conventional conveyor provided therein which extends between the forward and rearward ends thereof at the floor thereof to convey material in the box either forwardly or rearwardly.

A cross conveyor auger 20 is provided at the lower forward end of the box 12 as illustrated in FIG. 1. The numerals 22, 24 and 26 refer to beaters which extend across the forward end of the box 12 above the cross conveyor auger 20 as also seen in FIG. 1. A power take-off shaft 28 extends from a tractor or the like to drive the floor conveyor, cross conveyor auger 20, and beaters 22, 24 and 26 in conventional fashion.

Figure 2:
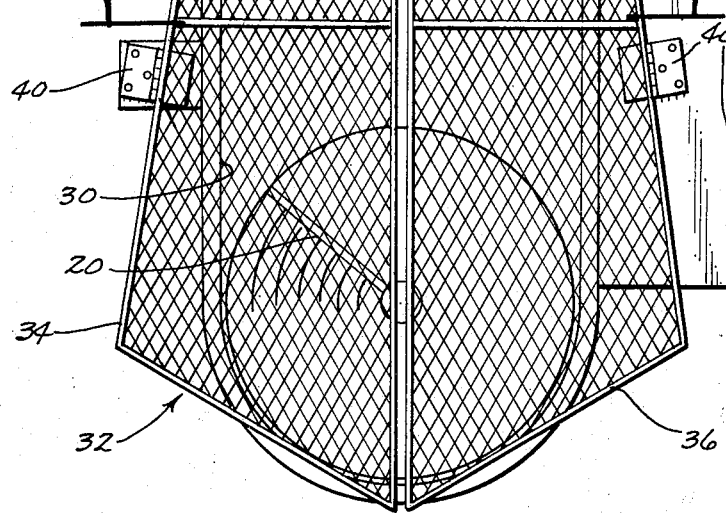
FIG. 2 is a side view of the safety door.
Figure 3:
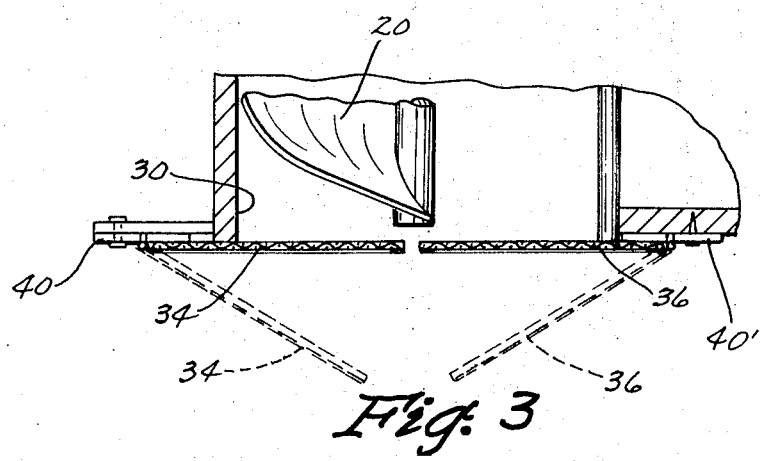
FIG. 3 is a sectional view seen along lines 3—3 of FIG. 2.

The numeral 30 refers to the discharge opening which is formed in side 18 at the lower forward end thereof. One end of the cross conveyor auger 20 communicates with the lower portion of the discharge opening 30. The cross conveyor auger 20 may or may not extend through the discharge opening 30 since the length of the cross conveyor auger 20 varies in different wagon models. The numeral 32 refers to the safety door of this invention generally comprising opposing door members 34 and 36. Door member 34 is pivotally connected to side 18 by hinges 38 and 40. Door member 36 is pivotally connected to side 18 by hinges 38' and 40'. As seen in FIG. 2, the hinge axis of each of the hinges 38 and 40 are not vertically disposed. Further, the hinges 38 and 40 are offset vertically with respect to each other. The relationship of the hinges 38 and 40 results in the door member 34 being self-closing as is door member 36. The door members 34 and 36 are preferably constructed of a mesh material or expanded metal material to permit the operator to see therethrough so that he may observe the mechanisms in the interior of the wagon.

In operation, the various components of the wagon are activated so as to discharge the material outwardly through the discharge opening 30. As previously described, the door members 34 and 36 are normally closed to prevent the operator from reaching into the interior of the box by way of the discharge opening. The door members 34 and 36 are automatically moved from their closed position to an open position upon the discharging material engaging the inside surfaces thereof to pivotally open the same.

The material or silage which is discharged by the unloading mechanism of the self-unloading wagon pushes against the door members 34 and 36 to open the same thereby permitting full flow of the silage from the discharge opening. When the flow of material decreases, the door members 34 and 36 swing closed to again form a barrier across the discharge opening of the self-unloading wagon. If the flow of material from the discharge opening is small, the door members 34 and 36 are only partially open. If the operator should attempt to place his arms through the discharge opening, he must first open the door members 34 and 36 and the pivotal movement of the doors against his arms interfere with such an operation to act as a deterrent.

Thus it can be seen that a unique safety door has been provided for a self-unloading wagon which prevents the operator from reaching into the interior of the box through the discharge opening. It can also be seen that the safety door does not interfere with the flow of material or feed through the discharge opening. Thus, the invention accomplishes at least all of its stated objectives.

We claim:
1. in combination,
   a self-unloading wagon comprising a material receiving box having opposite ends and sides, a first conveyor means in said box for conveying material therein towards the end thereof, said box having a discharge opening formed therein at one side thereof, adjacent said one end, a second conveyor means in said box at said one side for conveying material outwardly through said discharge opening, and a normally closed safety door means comprising a pair of opposing door members pivotally secured to said box, closing said discharge opening at times, said safety door means being moved from said closed position to an open position by the material being discharged outwardly through such discharge opening, said safety door means adapted to urge the safety doors into a normally closed position including hinge members secured thereto and secured to said box, the hinge axis of each hinge members on each of said doors being inclined so that said door members are self-closing.

2. The combination of claim 1 wherein said second conveyor means comprises a cross conveyor auger extending between the sides of said box; and a material beater means rotatably mounted in said box above said cross conveyor auger.

3. The combination of claim 2 wherein said door members are hingedly secured to said box so as to urge them into said normally closed position.

4. The combination of claim 1 wherein the hinge members on each of said door members are horizontally offset with respect to each other.

5. The combination of claim 4 wherein said door members are comprised of a mesh material to permit the operator to see therethrough.

* * * * *